April 26, 1966     H. H. AST     3,248,078
SUPPORT BRACKET
Filed April 30, 1964     2 Sheets-Sheet 1
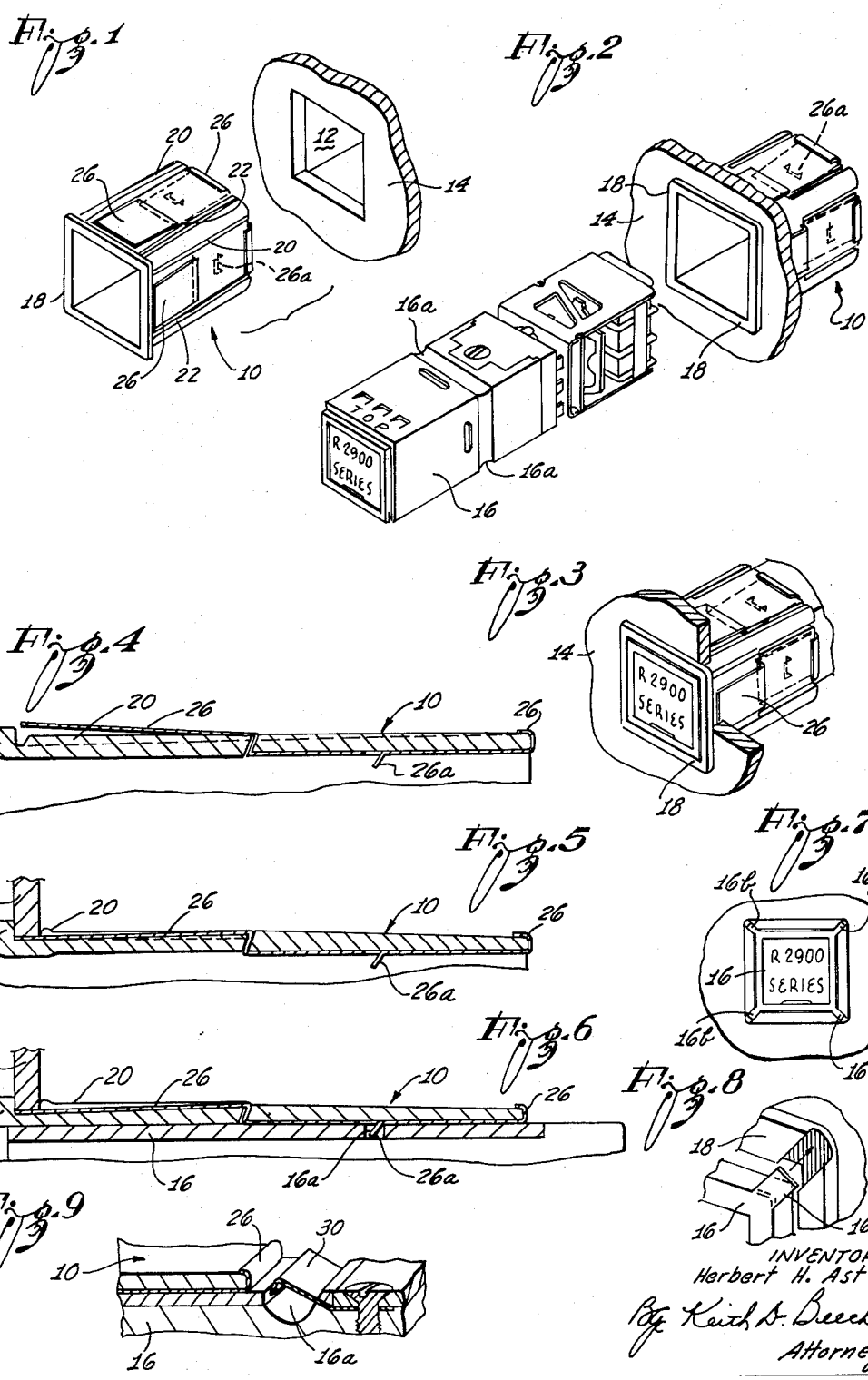
INVENTOR:
Herbert H. Ast
Keith D. Beecher
Attorney April 26, 1966 H. H. AST 3,248,078
SUPPORT BRACKET
Filed April 30, 1964 2 Sheets-Sheet 2
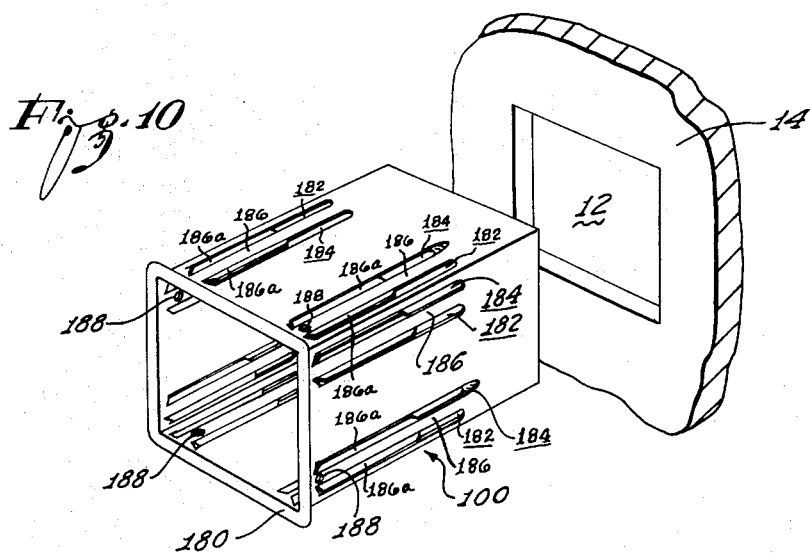
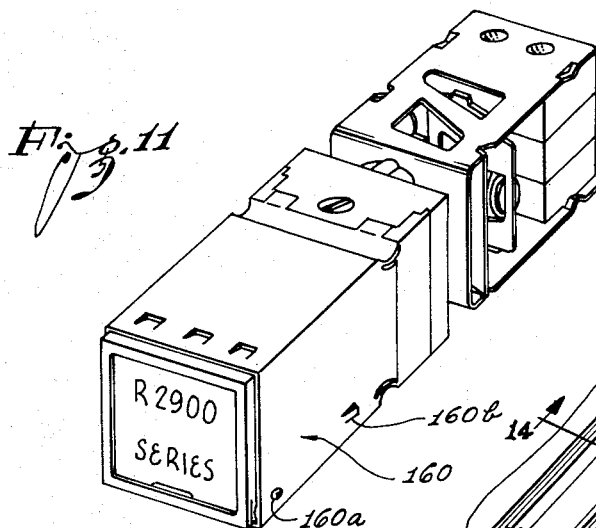
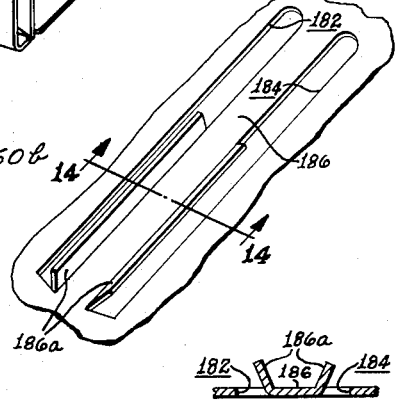
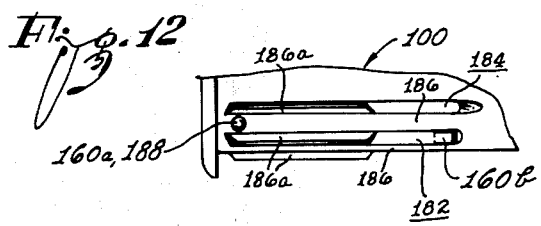
INVENTOR:
Herbert H. Ast
By Keith D. Beecher
Attorney

United States Patent Office

3,248,078
Patented Apr. 26, 1966

1

3,248,078
SUPPORT BRACKET
Herbert H. Ast, Pacific Palisades, Calif., assignor to Radar Relay, Inc., Santa Monica, Calif., a corporation of California
Filed Apr. 30, 1964, Ser. No. 363,767
3 Claims. (Cl. 248—27)

The present invention relates to the mounting of electrical indicators, such as electrical annunciators, and the like, and it relates more specifically to an improved bracket for mounting such indicators on a control panel.

An object of the present invention is to provide such an improved mounting bracket which serves to mount an electrical indicator, such as referred to above, on a panel, and to achieve this in a simple and expeditious manner, without the need for threads, nuts, lock washers, extraneous mounting holes, or the like; and which does not have any tendency to permit the supported unit to become loose in the presence of vibrations.

Another object of the invention is to provide such an improved bracket which may be mounted, togther with the supported unit, on the control panel without the need for tools, and in a quick and simple manner.

A further object of the invention is to provide such an improved mounting bracket which is simple to construct, which utilizes relatively inexpensive material, and which may be sold at a relatively low price.

A feature of the improved mounting bracket of the invention is that it may be used in conjunction with a wide range of panel thicknesses.

Another feature of the improved mounting bracket of the invention is the fact that it is capable of readily and conveniently supporting an electrical unit in the control panel, and in addition, it may be constructed to provide a heat conductive path from the housing of the supported unit to the control panel for heat sink purposes.

In the drawings:

FIGURE 1 is a perspective representation of a mounting bracket constructed in accordance with one embodiment of the invention, and illustrating the manner in which the bracket may be inserted into a cut-out in a control panel;

FIGURE 2 is a perspective representation of a switch-indicator assembly unit which may be conveniently supported on the control panel by means of the mounting bracket of the invention;

FIGURE 3 is a fragmentary perspective view illustrating the indicator-switching unit of FIGURE 2 supported on the control panel in the mounting bracket of the invention;

FIGURES 4, 5 and 6 are fragmentary cross-sectional representations of the mounting bracket, and illustrating the manner in which the mounting bracket supports the indicator-switching unit on the control panel, the latter representations being on an enlarged scale with respect to the representations of FIGURES 1–3;

FIGURE 7 is a front elevational view of a modification of the embodiment of FIGURES 1–3;

FIGURE 8 is an enlarged fragmentary view of the modification of FIGURE 7;

FIGURE 9 is a fragmentary perspective view of a further modification of the assembly;

FIGURE 10 is a perspective of a second embodiment of the invention;

FIGURE 11 is a view, like FIGURE 3, of the indicator-switching unit, modified to be mounted in the mounting bracket of FIGURE 1;

FIGURE 12 is a fragmentary, partially sectioned, side view of the bracket-unit assembly of FIGURES 10 and 11;

FIGURE 13 is a fragmentary perspective view of a

2 portion of the embodiment of FIGURE 10, shown on an enlarged scale; and

FIGURE 14 is a sectional view, taken along the line 14—14 of FIGURE 13.

The mounting bracket of the illustrated embodiment of the invention is designated as 10 in the accompanying drawing. This bracket is formed for example, of a pliable plastic material, such as polyethylene. The bracket has a tubular configuration, and in the particular embodiment shown in the drawing, it has a rectangular cross-section.

The particular illustrated bracket 10 has a rectangular cross-section, so that it may be received in a rectangular aperture 12 in a control panel 14, and so that it may appropriately mount a rectangular indicator-switching unit 16. The bracket 10 also includes a flange portion 18 which bears against the front surface of the panel 14, as shown in FIGURES 2 and 3, when the mounting bracket is in place. The control panel 14 may be composed, for example, of metal, as is the usual practice.

The body portion of the mounting bracket 10 has a pair of external ribs 20, 22 formed on each of its external faces. These ribs extend longitudinally along the length of the body portion in spaced parallel relationship.

A metallic strip 26 is mounted on each face of the bracket. This metallic strip may be formed, for example, of a spring-like heat conductive material, such as beryllium copper. Each of the strips 26 extends partially along the external surface of the corresponding face between the longitudinal ribs 20 and 22.

The strip 26 is inserted through a slot in the bracket, and it extends along the corresponding inner surface of the face to the rear end of the bracket. The rear extremity of the strip 26 may be turned around the rear edge of the bracket as shown, for example, in FIGURES 1, 4, 5 and 6. The strip 26 has an integral tab 26a which engages a groove 16a in the housing of the unit 16, when the bracket is in place supporting the switch-indicator unit on the panel 14.

To insert the bracket into the rectangular aperture 12 in the panel 14, the sides of the bracket are collapsed slightly at the rear end of the bracket, and it is inserted into the aperture from the position of FIGURE 1 so that it assumes the position of FIGURE 2. The bracket is moved into the rectangular aperture 12 until its flange 18 is seated against the front surface of the panel. Then, the switch-indicator unit 16 (FIGURE 2) is pushed slowly into the mounting bracket. The switching unit is moved slightly back and forth to be sure that it clears the tabs 26a.

The switching unit 16 is pushed into the mounting bracket 10 until the tabs 26a engage the grooves 16a in the housing of the switching indicator assembly. The switching-indicator assembly 16 is of the type described, for example, in copending application Serial No. 361,054, filed April 20, 1964 in which the front face glows in response to a monitored condition, and a switching function can be achieved by pushing the forward portion of the unit inwardly. The mounting bracket 10 supports the switching unit securely, by means of the tabs 26a, so that the front face can be pushed inwardly to perform the switching function.

As shown in FIGURES 4–6, the mounting bracket is firmly supported in the aperture 12, when the switching unit 16 is received in the mounting bracket. In FIGURE 4, the polyethylene plastic bracket 10 is shown with one of its beryllium copper spring strips 26. In FIGURE 5, the assembly of FIGURE 4 is shown as inserted into the aperture in the panel 14.

It will be observed that the panel partially deforms the longitudinal ribs, such as the ribs 20. When the unit 16 is received in the mounting bracket, as shown in FIGURE 6, the forward ends of the ribs, such as the rib 20 are compressed against the edge of the aperture in the panel 14, so that the mounting bracket, and the supported switching-indicator unit are firmly and rigidly supported on the panel.

The strips 26, as shown in FIGURES 5 and 6, engage the edge of the aperture of the metallic panel 14, and these make a positive contact between the housing of the switching-indicator unit 16 and the panel. The strips, therefore, serve as a heat conductive path between the housing of the unit 16 and the metal panel for heat sink purposes.

Suitable reliefs may be provided adjacent the compressible ribs 20, 22 to permit the material of the ribs to flow sideways into the relief areas, when the ribs are compressed against the panel 14 in the manner shown in FIGURE 6.

As shown in FIGURE 6, for example, the retaining tabs 26a snap into the grooves 16a when the unit 16 is in place in the mounting bracket. However, the unit can be removed from the panel by pushing it from the back, and thereby deforming the tabs 26a. If sufficient pressure is exerted against the rear end of the unit 16, it can be removed from the panel.

In the embodiment of FIGURES 7 and 8, the switching-indicator unit 16 is provided with a plurality of ear-like members 16b (FIGURE 7). These ear-like members extend outwardly from the forward corners of the unit, and they engage corresponding grooves in the flange 18 (FIGURE 8) of the mounting bracket 10. These ears serve as stops against inward movement of the switching unit with respect to the mounting bracket, when the forward portion of the unit is depressed, for example, to perform the switching function.

The use of the ears 16b obviates any need for the tabs 26a on the strips 26. However, a latch 30 composed, for example, of beryllium copper or other spring-like material, may be provided on the switching unit itself adjacent the groove 16a (FIGURE 9). This latch engages, for example, the rear edge of the strip 26 on the mounting bracket 10 to hold the unit 16 in place in the mounting bracket. The unit 16 can be removed merely by exerting enough force on the rear end of the unit to distort the latch 30 and enable the unit 16 to be moved outwardly through the mounting bracket 10.

The invention provides, therefore, a simple mounting bracket for supporting a switching-indicator unit, or the like, in place on a control panel.

An advantage of the improved mounting bracket of the invention is the fact that it can be used quickly and conveniently to mount the corresponding switching-indicator unit, and without the need for tools, mounting screws, or the like.

Moreover, when the switching-indicator unit is supported by the bracket of the invention, it is so supported in a rigid and firm manner, and is not susceptible to becoming loose, in the presence of vibrations or the like.

In addition, the enclosing mounting bracket may be constructed to include heat conductive strips, as described above, so as to provide a conductive path for heat dissipated by the unit to the panel, for heat sink purposes.

Although the mounting bracket described above is formed of a pliable plastic material and includes metallic strips as heat sinks, it is evident that the bracket could be composed of metal. In such an event the bracket itself conducts heat to the panel for heat sink purposes, and no extra metallic strips are required.

The metallic bracket may be formed, for example, of a resilient metal such as beryllium copper or spring steel. In such a construction, longitudinal grooves may be formed in the outer faces to produce corresponding ribs on the inner surfaces. The grooves may be filled with a pliable material, such as Teflon, silicon rubber, or the like.

Then when the latter bracket is inserted in the panel, the subsequent insertion of the indicator unit causes the inner ribs to force the pliable material against the edge of the opening in the panel. This action permits the bracket to hold the indicator unit firmly and rigidly in place on the panel.

The mounting bracket of the embodiment shown in FIGURE 10 is of the last mentioned type and it is designated 100. This latter bracket is composed of a metal, such as beryllium copper or spring steel, which exhibits some degree of flexibility. The bracket 100 has a rectangular cross-section, so that it may be received in the rectangular aperture 12 in the panel 14, and so that it may appropriately mount the rectangular indicator-switching unit 160 of FIGURE 11.

The bracket 100 also includes a flange portion 180 which bears against the front surface of the panel 14 when the mounting bracket is in place.

The body portion of the mounting bracket 100 has a pair of longitudinal slots 182, 184 formed adjacent each of its edges. A longitudinal rib 186 is formed between each pair of longitudinal slots 182, 184. The ribs are formed with upstanding sides 186a, as best shown, for example, in FIGURE 12. An aperture 188 is formed in the front end of each of the ribs 186.

The indicator-switching unit 160 has one or more projections 160a formed in its sides adjacent the front of the unit. These projections drop into the holes 188 when the unit is supported in the bracket 100 in the aperture 12 on the panel 14.

The indicator-switching unit 160 also has a lance 160b formed in its sides, and this lance engages the end of a corresponding slot 182 or 184 of the bracket 100, when the unit 160 is in place.

The lances 160b, therefore, serve to limit the rearward movement of the unit 160 in the bracket 100, so that the unit may be securely held against rearward movement in the bracket. The projections 160a, on the other hand, resiliently hold the unit in the bracket against forward movement, in the engagement of these projections with the sides of the holes 188.

However, the resilient resistance of the projections 160a can be overcome, by pushing the unit 160 from the rear; when it is desired to remove the unit from the panel.

To mount the unit 160 on the panel 14, the bracket 100 is first inserted into the aperture 12. Then the unit 160 is pushed into the bracket. This causes portions of the upstanding sides of the ribs 186 to be moved against the sides of the aperture 12 and flatten, so that the bracket is firmly held against longitudinal movement in the panel.

The unit 160 is moved back into the bracket 100 until its lances 160b engage the rear end of the slots 182 or 184; and until its projections 160a drop into the holes 188.

While particular embodiments of the invention have been shown and described, modifications may be made. It is intended in the claims to cover all such modifications which fall within the spirit and scope of the invention.

What is claimed is:

1. A bracket for a rectangular indicator unit, and the like, for supporting the unit in a rectangular aperture in a control panel, or the like, comprising: a tubular body portion of rectangular cross-section formed of a pliable plastic material and having a pair of spaced longitudinal ribs extending along the length of each face thereof, said body portion being configured to fit into said aperture and to receive said unit therein, thereby causing an end portion of each of said ribs to be compressed by said unit against the edge of said aperture; a flange portion formed integral with one end of said body portion in position to bear against the front surface of said panel; and a metallic strip mounted on at least one face of said body portion and extending externally along said face between the spaced longitudinal ribs thereon, said strip extending partially along said external face and partially along the corresponding internal face of said tubular portion, and said strip having a protruding tab formed thereon for engaging said unit.

2. A bracket for mounting an indicator unit, or the like, in an aperture in a support panel, comprising: a hollow resilient, metallic body portion having longitudinal ribs formed therein each between a pair of longitudinal slots and each having upstanding pliable sides extending along at least a portion of the length thereof, said body portion being configured to fit into said aperture and to receive said unit therein thereby causing the end portion of each of said pliable sides of said ribs to be compressed by said unit against the edge of said aperture so as to cause said body portion to be rigidly mounted in said panel, at least one of said slots terminating at a point intermediate the end of said tubular body portion to receive a first projection from said unit.

3. The bracket defined in claim 2 in which at least one of said ribs has an aperture therein to receive a second projection from said unit.

References Cited by the Examiner

UNITED STATES PATENTS

| | | | |
|---|---|---|---|
| 1,490,252 | 4/1924 | Bissell | 220—3.6 |
| 1,916,194 | 7/1933 | Godley | 229—3.6 |
| 2,128,040 | 8/1938 | Conners | 285—162 |
| 2,244,977 | 6/1941 | Hansman et al. | 285—162 |
| 2,935,666 | 5/1960 | Van Namen | 317—234 |
| 2,976,345 | 3/1961 | Whitted | 174—153 |
| 3,007,599 | 11/1961 | Greasley | 220—18 |
| 3,033,624 | 5/1962 | Biesecker | 308—238 |
| 3,038,703 | 6/1962 | Deakin | 257—263 |
| 3,146,051 | 8/1964 | Woofter et al. | 339—47 |

CLAUDE A. LE ROY, *Primary Examiner.*

FRANK L. ABBOTT, *Examiner.*

R. P. SEITTER, *Assistant Examiner.*